2,990,247
ALUMINUM COMPOUNDS
Charles R. Conard, Ferguson, Mo., and John F. Lemp, Alton, Ill., assignors to Mallinckrodt Chemical Works, St. Louis, Mo., a corporation of Missouri
Filed Jan. 27, 1958, Ser. No. 711,208
5 Claims. (Cl. 23—110)

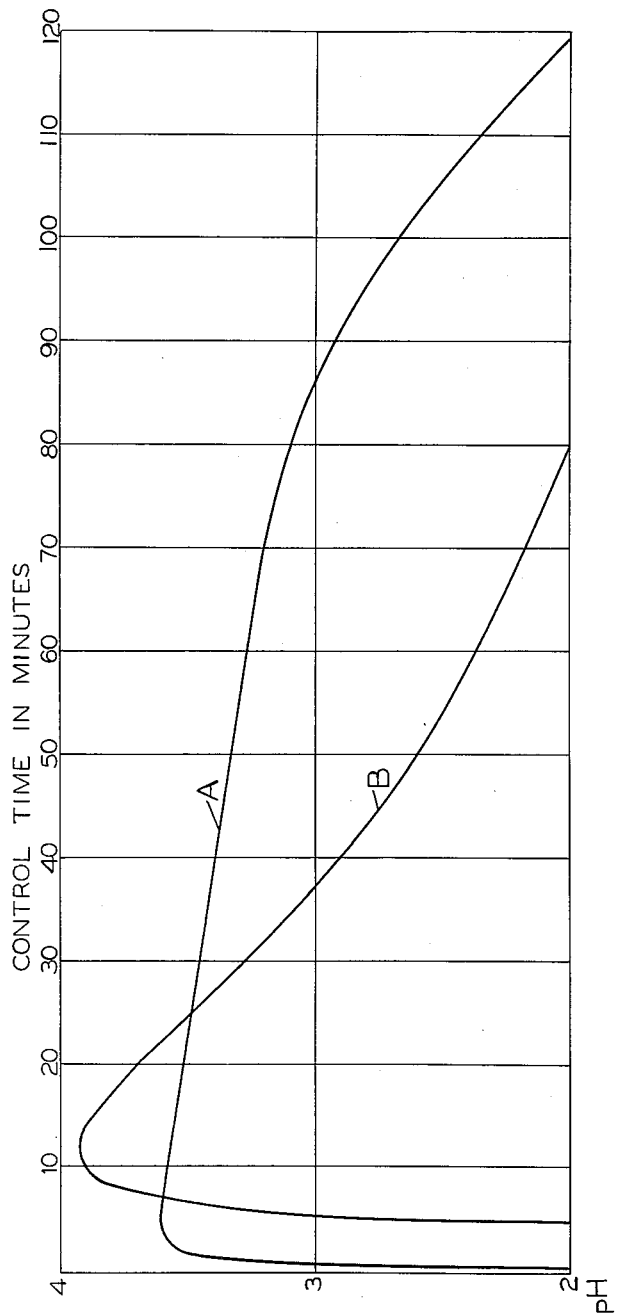

This invention relates to novel aluminum compounds, and more particularly to magnesium aluminum silicates.

Briefly the present invention is directed to novel magnesium aluminum silicates corresponding to about the empirical formula:

$$2MgO \cdot yAl_2O_3 \cdot 3SiO_2 \cdot zH_2O$$

where $z$ is a number such that the loss on ignition of the composition is not less than approximately 20% by weight; and to methods for the preparation of said compositions.

Among the objects of the present invention are the provision of basic magnesium aluminum silicate compositions having improved acid-neutralizing properties; the provision of compositions of the character described which retain their reactivity indefinitely under normal storage conditions; the provision of compositions of the character described which combines high neutralizing capacity with superior buffering ability, and the provision of methods for preparing compositions of the character described. Other objects of the invention will be in part apparent and in part pointed out hereinafter.

The invention accordingly comprises the products and methods hereinafter described, the scope of the invention being indicated in the following claims.

Aluminum hydroxide gel and magnesium trisilicate have been employed individually and in admixture for the purpose of neutralizing excess acid in the stomach and for other purposes. Of the two, freshly prepared aluminum hydroxide gel has the greater neutralizing capacity. However, on drying and/or during storage it rather rapidly loses its capacity and for that reason its efficacy and therefore its usefulness soon deteriorates. Moreover, it has an undesirable constipative effect. To offset this latter effect, aluminum hydroxide gel is sometimes mixed with magnesium trisilicate, a mild laxative. Such mixtures, however, are no more stable than aluminum hydroxide alone and also deteriorate on storage. If used in excess, magnesium trisilicate alone permits a maximum pH above 6 whereas a maximum pH of 3-4 is generally considered desirable.

According to the present invention, a precipitated magnesium aluminum silicate may be prepared which has the desirable acid neutralizing properties of freshly prepared aluminum hydroxide gel-magnesium trisilicate mixtures but which, surprisingly, retains its activity indefinitely under normal storage conditions.

In its preferred embodiment the precipitated magnesium aluminum silicate composition of the present invention corresponds to the empirical formula $$2MgO \cdot Al_2O_3 \cdot 3SiO_2 \cdot 8H_2O$$

However, these proportions may be varied within certain limits without losing the essential advantages of the present invention. For example, the proportion of aluminum may be varied in the formula from 0.65 $Al_2O_3$ to 1.3. Below about 0.65 $Al_2O_3$ the buffering effect of the composition is poor and the acid-consuming capacity is low. Above about 1.3 $Al_2O_3$ the product becomes undesirably bulky, and the acid-consuming capacity is adversely affected.

The compositions of the present invention are designated as precipitated magnesium aluminum silicates to distinguish them from naturally occurring silicates containing both magnesia and alumina which are essentially inactive, and from the previously known mixtures of aluminum hydroxide and magnesium trisilicate which deteriorate on storage.

The precipitated magnesium aluminum silicates of the present invention are prepared by combining a stoichiometric quantity of a soluble aluminum salt, such as aluminum sulfate, an excess of a soluble magnesium salt such as magnesium sulfate, and a quantity of an alkali metal silicate solution containing a stoichiometric quantity of $SiO_2$ and a quantity of alkali metal oxide equivalent to the sum of the desired amounts of MgO and $Al_2O_3$ in the final product. The physical form of the precipitated magnesium aluminum silicate may then be improved by heating the resulting slurry and allowing it to age. If desired, the magnesium aluminum silicate may be dried at temperatures not exceeding about 100° C.

The proportions of the components in the compositions of the present invention are easily controlled by regulating the proportions of the reactants. The proportions of alumina and silica are determined by the amounts of aluminum salt and sodium silicate added to the reaction mixture. An excess of magnesium ions in the final mixture is preferable to an excess of caustic. Therefore, the magnesia content is preferably determined by the amount of caustic used; i.e., the amount of caustic, including that from the sodium silicate solution, should be equivalent to the sum of the alumina and magnesia contents. For example, in a product to contain 2 mols of MgO and 1 mol $Al_2O_3$, the total amount of caustic should be equivalent to 5 mols of $Na_2O$. A sufficient excess of magnesium ions is then added to insure complete reaction.

The manner and order of combining the reactants may be varied over a wide range. The primary effect of such variations is on the physical characteristics of the product such as uniformity, bulk, and particle size, while the fundamental chemical characteristics such as acid-neutralizing capacity, buffering action, and stability of the product with respect to these characteristics, which are primarily a function of chemical composition, are relatively unaffected.

The precipitation of the magnesium aluminum silicate is preferably carried out in a reaction mixture having a pH greater than 7 in order to avoid the inclusion of basic sulfates which are rather insoluble and difficult to remove by washing. Therefore, the magnesium and aluminum sulfates, solutions of which salts are acid in character, are preferably added to the alkaline silicate solution, rather than the reverse.

In place of the sulfates of magnesium and aluminum, other common water-soluble salts of these metals such as the chlorides, nitrates and acetates may be used. Still other halides or organic acid salts might be used, but these are less common, more expensive, and do not offer any advantages.

The concentrations of the reactants are not critical. It is usually most efficient to carry out the reactions at the greatest concentrations which will provide a fluid and easily stirred reaction mixture. More important is the rate at which the reactants are combined. To obtain maximum uniformity and optimum physical properties, the magnesium and aluminum salts should be combined slowly with the sodium silicate and with efficient stirring. Rapid combination of concentrated solutions with inadequate stirring tends to produce impure, non-uniform products.

The aluminum sulfate may be added either before or after the magnesium sulfate or the two may be added together. If they are added separately, the addition of one may follow immediately after the addition of the other, or there may be a delay in order to permit the intermediate precipitate to age. Aging the intermediate product under substantially neutral conditions tends to give less bulky final products, whereas aging the intermediate product in the presence of excess alkali tends to have the opposite effect.

The precipitation is preferably carried out at temperatures not exceeding 50° C. since at higher precipitation temperatures the acid neutralizing activity of the product tends to be adversely affected. Once precipitation of the final product is complete, the temperature may be increased to 70–90° C. for a period of time without harm to the product unless such heating is unduly prolonged. In many cases it has been found that such a heating or aging period has a desirable effect on the physical characteristics of the precipitate, primarily in making it easier to filter and wash.

If desired, the precipitated magnesium aluminum silicates of the present invention may be dried at temperatures not substantially in excess of 100° C. without harm to their acid-consuming capacity, or the products may be used as aqueous suspensions after removing the water-soluble by-products of the reaction. If dried, a loss on ignition of approximately 20% by weight is the minimum which can be attained without employing drying temperatures that would be deleterious to the product.

The precipitated magnesium aluminum silicates of the present invention are useful wherever it is desired to neutralize excess acid, especially where the amount of acid to be neutralized is indefinite and an excess of base must be added without producing an alkaline condition. They are, therefore, particularly useful for neutralizing excess acid in the stomach. Their acid-consuming capacity is intermediate between that of freshly precipitated aluminum hydroxide gel and magnesium trisilicate and generally exceeds the capacity of dried aluminum hydroxide gel which has been stored any length of time. The precipitated magnesium aluminum silicates of the present invention may be used as active ingredients in either solid or liquid preparations for the treatment of excess stomach acidity, and they may be used alone or in combination with other chemically compatible, non-acidic ingredients.

The precipitated magnesium aluminum silicates are much superior to aluminum hydroxide gel and mixtures containing aluminum hydroxide gel, with respect to stability. As is well-known, aluminum hydroxide gel, especially in the dry form, steadily decreases in activity with time. Its storage life is, therefore, relatively short. The precipitated magnesium aluminum silicates, on the other hand, show no evidence of any decrease in activity on storage, either in dry or liquid form. This is surprising since in most respects they are comparable to a mixture of freshly prepared aluminum hydroxide gel with magnesium trisilicate.

Precipitated magnesium aluminum silicates are also clearly superior to magnesium trisilicate with respect to buffering qualities. Not only do they exert their buffering effect for a longer period of time, but the maximum pH is in the neighborhood of 3–4 rather than 6–7 as in the case of magnesium trisilicate. While precipitated magnesium aluminum silicate is comparable to freshly prepared mixtures of active aluminum hydroxide gel and magnesium trisilicate, the buffering qualities of the latter steadily deteriorate with time owing to the decrease in the activity of the aluminum hydroxide. Precipitated magnesium aluminum silicate, on the other hand, retains its excellent buffering characteristics indefinitely.

The following examples further illustrate the invention.

Example 1

To 0.96 liter of a well stirred solution of sodium silicate (116 g. $Na_2O$ and 168 g. $SiO_2$ per liter) was added 0.625 liter of magnesium sulfate solution (314.6 g. $MgSO_4$ per liter) dropwise over a period of about 90 minutes and at a temperature of about 35° C. To this slurry 0.91 liter of sodium hydroxide solution (237.3 g. NaOH per liter) was added rapidly with stirring, followed immediately by 1.047 liters of aluminum sulfate solution (570.4 g. $Al_2(SO_4)_3 \cdot 18H_2O$ per liter) over a period of approximately 90 minutes. Finally, another 0.1 liter of the magnesium sulfate solution was added to insure an excess. Stirring was continued and the slurry was warmed to 70° C., and left to stand overnight at 65–70° C. The magnesium aluminum silicate was then filtered, washed, dried at 65° C. until the loss on ignition was 28%, and then finely milled. The molar ratio of $Al_2O_3$ to MgO in this product was approximately 1:2 and the molar ratio of $Al_2O_3$ to $SiO_2$ was approximately 1:3. Bulks of 50–90 fl. oz. per lb. are typical.

Example 2

A caustic silicate solution was prepared by dissolving 197 g. of sodium hydroxide in 1.024 liters of sodium silicate solution (116 g. $Na_2O$ and 168 g. $SiO_2$ per liter) and diluting to a density of 27.7° Bé.

A solution of aluminum sulfate was prepared by dissolving 547 g. of $Al_2(SO_4)_3 \cdot 18H_2O$ in 1.024 liters of water and to this was added 0.665 liter of a magnesium sulfate solution (314.6 g. $MgSO_4$ per liter).

The aluminum sulfate-magnesium sulfate was then added dropwise with stirring over a period of about 4 hours to the caustic sodium silicate solution at a temperature of 35° C. An additional 0.1 liter of the magnesium sulfate solution was added and the temperature was slowly raised to 65–70° C. with continued stirring. After two hours, the solution was allowed to stand at 75° C. overnight without stirring and then for several days at room temperature. The magnesium aluminum silicate was then filtered off, washed, dried at about 65° C. until the loss on ignition was 26%, and then finely milled. The molar ratio of $Al_2O_3$ to MgO in this product was approximately 0.86:2.

In order to obtain a product in which the molar ratio of $Al_2O_3$ to MgO is 1:2, the amount of sodium hydroxide dissolved in the sodium silicate solution should be increased to 229 g. and the amount of aluminum sulfate used should be increased to 637 g. $Al_2(SO_4)_3 \cdot 18H_2O$. The bulk of the product is typically 50–60 fl. oz. per lb.

Example 3

Example 1 was repeated except that the magnesium silicate slurry was heated to 70° C. and then allowed to cool and stand for 24 hours before the addition of the sodium hydroxide and aluminum sulfate solutions. This method tends to give a somewhat more dense product than the method of Example 1, but otherwise products are comparable.

Example 4

Example 1 was repeated except that the magnesium silicate slurry was allowed to age for 24 hours after the addition of the sodium hydroxide solution and before the addition of the aluminum sulfate solution. This modification causes a large increase in bulk (bulks of over 100 fl. oz. per lb. are typical).

Example 5

To 0.96 liter of a solution of sodium silicate (116 g. $Na_2O$ and 168 g. $SiO_2$ per liter) at a temperature of about 35° C. was added 0.31 liter of sodium hydroxide solution (237.3 g. NaOH per liter) rapidly with stirring followed by the gradual addition of 1.047 liter of aluminum sulfate solution (570.4 g. $Al_2(SO_4)_3 \cdot 18 H_2O$ per liter) over a period of about 90 minutes. Thereafter an additional 0.6 liter of the sodium hydroxide was added followed by the gradual addition of 0.725 liter of magnesium sulfate solution (570.4 g. $Al_2(SO_4)_3 \cdot 18H_2O$ per liter) of about 90 minutes. The resulting slurry of magnesium aluminum silicate was thereafter treated as described in Example 1. As in Example 1, the molar ratio of $Al_2O_3$ to MgO was approximately 1:2 and the molar ratio of $Al_2O_3$ to $SiO_2$ was approximately 1:3. The product obtained by this method of preparation is of medium high bulk, intermediate between the products obtained by the methods of Examples 1 and 4, and shares the same excellent antacid properties.

Example 6

The following method was used to determine the acid consuming capacity of the products of the present invention and compare them with the substances and mixtures employed heretofore.

The acid consuming capacity of the product described in Example 1 was measured by determining the weight of antacid required to neutralize 340 ml. of 0.1 N hydrochloric acid to a pH of 2.8. This is an approximation of the conditions encountered in actual use when the substance is used to correct excess stomach acidity. The resulting value can be designated as the "equivalent dose" for purposes of comparing it with other antacid substances.

Typical values for the equivalent dose for magnesium aluminum silicate and other analogous substances were found to be as follows.

| Material | Equivalent Dose g. |
|---|---|
| Precipitated magnesium aluminum silicate (30% moisture) | 1.78 |
| Undried aluminum hydroxide gel | 1.10 |
| Commercial mixtures of aluminum hydroxide gel and magnesium trisilicate g. | [1] 1.16–2.36 |
| Magnesium trisilicate | 2.96 |
| Magnesium carbonate | 1.59 |
| Sodium bicarbonate | 2.60 |
| Magnesium hydroxide | 0.99 |

[1] Based on active ingredients. Based on total weight the equivalent dose ranges from 1.77–4.72 g.

Example 7

The buffering effect of magnesium aluminum silicate was measured and compared with other antacid substances in the following manner:

An equivalent dose of the substance to be tested, determined as in Example 6, was added to 100 ml. of constantly stirred 0.1 N hydrochloric acid maintained at a temperature of 37.5±0.5° C. A few drops of a wetting agent was added to insure thorough wetting of the sample. The pH was determined at the end of 1, 3, 5 and 10 minutes after addition of the sample and at the end of each 10 minute period thereafter. After each 10 minute pH reading, 2 ml. of 1.0 N hydrochloric acid was added. Observations were continued until the pH dropped below 2.

The buffering effects of the test compounds were compared in terms of duration of pH control and the peak pH developed during the test.

| Substance | Duration of pH control, minutes | peak pH |
|---|---|---|
| Precipitated magnesium aluminum silicate (30% moisture) | 120 | 3.6 |
| Undried aluminum hydroxide gel | 120 | 3.9 |
| Commercial mixtures of aluminum hydroxide gel and magnesium trisilicate | 80–120 | 3.5–5.0 |
| Magnesium trisilicate | 104 | 6.6 |
| Magnesium carbonate | 130 | 7.7 |
| Sodium bicarbonate | 120 | 8.0 |
| Magnesium hydroxide | 134 | 9.0 |

FIGURE 1 shows a typical neutralization curve for the precipitated magnesium aluminum silicate of the present invention compared with a similar curve for aluminum hydroxide in admixture with magnesium trisilicate.

Example 8

The stability of magnesium aluminum silicate was demonstrated as follows: Samples of magnesium aluminum silicate prepared as described in Example 1 were suspended in distilled water and stored for a period of five months. Initially the duration of pH control was 122 min. and the peak pH was 3.49, when determined by the method described in Example 7. At the end of the storage test the duration was 123 minutes and the peak pH was 3.51.

Example 9

Precipitated magnesium aluminum silicate prepared as described in Example 1 was compared with two different physical mixtures, aluminum hydroxide and magnesium trisilicate following the procedure described in Example 7. The first mixture, designated A, was prepared by combining aqueous slurries of magnesium trisilicate and precipitated aluminum hydroxide and then separating and drying the solids. The second mixture, designated B, was prepared by dry-mixing magnesium trisilicate and aluminum hydroxide dried gel. In addition to determining the duration of pH control, the time required to raise the pH of the 0.1 N hydrochloric acid from 1 to 3 was also determined.

| Material | Percent $Al_2O_3$ | Time to pH>2, min. | Time to pH>3, min. | Duration of pH control, minutes |
|---|---|---|---|---|
| Magnesium aluminum silicate (30% moisture) | 20 | <0.5 | 1 | 120 |
| Mixture A | 22 | 0.5 | 1 | 106 |
| Mixture B | 20 | 1 | 3 | 94 |
| Aluminum hydroxide gel | 60 | 1 | 2 | 118 |
| Magnesium trisilicate powder | 0 | <0.5 | 1 | 104 |
| Commercial mixtures of aluminum hydroxide gel and magnesium trisilicate: | | | | |
| 1 | 43.5 | 6 | 10 | 103 |
| 2 | 22.5 | 5 | 7 | 80 |
| 3 | 26.0 | 5 | 10 | 98 |

The exact structure of the precipitated magnesium aluminum silicates of the present invention is not clear, however, the available evidence all indicates that the components are chemically bound and are not present merely as a physical mixture. The stability of the compositions is perhaps the most striking evidence for this, but there are also other indications. There are small but significant differences in the infrared absorption spectra of precipitated magnesium aluminum silicate and physical mixtures of aluminum hydroxide and magnesium trisilicate whether prepared by wet or dry methods. This evidence, while not conclusive, strongly suggests a chemical bond between alumina and silica in the compositions of the present invention. Magnesium aluminum silicate prepared according to the preferred conditions of the present invention so as to preclude the incidental formation of inactive $Al_2O_3$, is substantially completely soluble in $N/10$ hydrochloric acid. Physical mixtures do not dissolve completely. Precipitated magnesium aluminum silicate of the present invention will continue to hydrate or dehydrate, depending upon atmospheric conditions, without any significant change in its chemical properties when compared on an anhydrous basis. Finally, the time required to raise the pH of a $N/10$ hydrochloric acid solution from 1 to 3 is shorter for precipitated magnesium aluminum silicate than for aluminum hydroxide gel alone or physical mixtures of aluminum hydroxide gel and magnesium trisilicate.

While it is to be taken only in an illustrative and not in a limiting sense, the properties of the precipitated magnesium aluminum silicates of the present invention are best accounted for by the following formula:

$$2MgO \cdot 2AlO(OH) \cdot 3SiO_2 \cdot xH_2O$$

where $x$ is approximately 7, but may vary with atmospheric conditions.

In view of the above, it will be seen that the several objects of the invention are achieved and other advantageous results attained.

As various changes could be made in the above methods and products without departing from the scope of the invention, it is intended that all matter contained in the above description or shown in the accompanying drawing shall be interpreted as illustrative and not in a limiting sense.

We claim:

1. The method of making a precipitated magnesium aluminum silicate of about the following empirical formula:

$$2MgO \cdot Al_2O_3 \cdot 3SiO_2 \cdot zH_2O$$

where $z$ is a number such that the loss on ignition of the composition is not less than approximately 20% by weight, which comprises gradually adding a solution of magnesium sulfate to a solution of sodium silicate at a temperature not exceeding approximately 50° C., the said silicate solution containing silica and alkali in the proportions $3SiO_2:2Na_2O$ and the said magnesium sulfate solution containing sufficient $MgSO_4$ to react with a major proportion but less than all of the alkali in the sodium silicate solution; adding additional alkali to the reaction mixture in the proportions of 3 mols of $Na_2O$ for each mol of $SiO_2$ in the reaction mixture; thereafter adding aluminum sulfate solution in an amount corresponding to approximately 1 mol $Al_2O_3$ for each 3 mols of $SiO_2$ present in the reaction mixture; adding additional magnesium sulfate solution sufficient to provide an excess of magnesium ions over those required to complete the reaction; increasing the temperature to approximately 65–70° C. to complete the reaction; and thereafter recovering the precipitated magnesium aluminum silicate.

2. A precipitated magnesium aluminum silicate of about the following empirical formula:

$$2MgO \cdot Al_2O_3 \cdot 3SiO_2 \cdot zH_2O$$

where $z$ is a number such that the loss on ignition of the composition is not less than approximately 20% by weight.

3. A precipitated magnesium aluminum silicate corresponding to the following empirical formula:

$$2MgO \cdot Al_2O_3 \cdot 3SiO_2 \cdot zH_2O$$

where $z$ is a number such that the loss on ignition of the composition is not less than approximately 20% by weight.

4. A precipitated magnesium aluminum silicate corresponding to the following empirical formula:

$$2MgO \cdot Al_2O_3 \cdot 3SiO_2 \cdot 8H_2O$$

5. The method of making a precipitated magnesium aluminum silicate substantially corresponding to the empirical formula:

$$2MgO \cdot Al_2O_3 \cdot 3SiO_2 \cdot zH_2O$$

where $z$ is a number such that the loss on ignition of the composition is not less than approximately 20% by weight, which comprises combining in aqueous solution an alkali metal silicate containing a known quantity of $SiO_2$ and an amount of alkali metal oxide chemically equivalent to the required amounts of $Al_2O_3$ and $MgO$, a quantity of a soluble aluminum salt equivalent to the required amount of $Al_2O_3$ and a quantity of a soluble magnesium salt in excess of that necessary to provide the required amount of $MgO$, and separating the precipitated magnesium aluminum silicate from the reaction mixture.

References Cited in the file of this patent

UNITED STATES PATENTS

| | | |
|---|---|---|
| 1,087,705 | Allen | Feb. 17, 1914 |
| 1,759,919 | Singer | May 27, 1930 |
| 2,540,689 | Porret | Feb. 6, 1951 |

OTHER REFERENCES

Strotzer: German patent application, G 8505, published Oct. 27, 1955, Class 30h.

UNITED STATES PATENT OFFICE
CERTIFICATE OF CORRECTION

Patent No. 2,990,247            June 27, 1961

Charles R. Conard et al.

It is hereby certified that error appears in the above numbered patent requiring correction and that the said Letters Patent should read as corrected below.

Column 1, line 15, for "$2MgO \cdot yAl_2O_3 \cdot 3SiO_2 \cdot zH_2O$" read -- $2MgO \cdot Al_2O_3 \cdot 3SiO_2 \cdot zH_2O$ --; line 26, for "combines" read -- combine --; column 4, line 50, after "otherwise" insert -- the --; lines 71 and 72, for "(570.4 g. $Al_2(SO)_3 \cdot 18H_2O$ per liter) of about 90 minutes" read -- (314.6 g. $MgSO_4$ per liter) over a period of about 90 minutes --; column 8, line 23, for "MgO." read -- MgO, --.

Signed and sealed this 21st day of November 1961.

(SEAL)
Attest:

ERNEST W. SWIDER
Attesting Officer

DAVID L. LADD
Commissioner of Patents

USCOMM-DC